United States Patent
Byun et al.

(10) Patent No.: US 11,457,372 B2
(45) Date of Patent: Sep. 27, 2022

(54) METHOD AND APPARATUS FOR SUPPORTING LINK CONGESTION DETECTION IN WIRELESS COMMUNICATION SYSTEM

(71) Applicant: LG ELECTRONICS INC., Seoul (KR)

(72) Inventors: Daewook Byun, Seoul (KR); Jian Xu, Seoul (KR); Seokjung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/972,196

(22) PCT Filed: Jul. 22, 2019

(86) PCT No.: PCT/KR2019/009000
§ 371 (c)(1),
(2) Date: Dec. 4, 2020

(87) PCT Pub. No.: WO2020/017941
PCT Pub. Date: Jan. 23, 2020

(65) Prior Publication Data
US 2021/0235291 A1    Jul. 29, 2021

(30) Foreign Application Priority Data

Jul. 20, 2018 (KR) .................. 10-2018-0085010
Feb. 14, 2019 (KR) .................. 10-2019-0017475

(51) Int. Cl.
*H04W 24/04* (2009.01)
*H04W 28/02* (2009.01)
(Continued)

(52) U.S. Cl.
CPC ....... *H04W 24/04* (2013.01); *H04W 28/0236* (2013.01); *H04W 40/12* (2013.01); *H04W 88/085* (2013.01); *H04W 92/20* (2013.01)

(58) Field of Classification Search
CPC ............. H04W 24/04; H04W 28/0236; H04W 40/12; H04W 40/22; H04W 88/085;
(Continued)

(56) References Cited

U.S. PATENT DOCUMENTS

2017/0006499 A1    1/2017  Hampel et al.
2017/0064731 A1    3/2017  Wang et al.
(Continued)

OTHER PUBLICATIONS

Huawei et al., "Adaptation layer design," R2-1810675, 3GPP TSG-RAN WG2 Ad Hoc, Montreal, Canada, Jun. 22, 2018, see seciton 2.1; and figure 1.
(Continued)

*Primary Examiner* — Robert C Scheibel
(74) *Attorney, Agent, or Firm* — Dentons US LLP

(57) ABSTRACT

A method and apparatus for supporting a link congestion detection in a in an integrated access and backhaul (IAB) network is provided. An IAB-donor-central unit (CU) performs downlink (DL) transmission, receives information about a problem on a backhaul (BH)-radio link control (RLC) channel between a first IAB-node and a second IAB-node, and stop/reduces the DL transmission to the second IAB-node via the BH-RLC channel between the first IAB-node and the second IAB-node based on the information. The IAB-donor-CU may select a path towards the second IAB-node other than the BH-RLC channel between the first IAB-node and the second IAB-node, and perform DL transmission towards the second IAB-node via the selected path.

8 Claims, 15 Drawing Sheets

(51) Int. Cl.
*H04W 40/12* (2009.01)
*H04W 88/08* (2009.01)
*H04W 92/20* (2009.01)

(58) Field of Classification Search
CPC ... H04W 88/14; H04W 92/20; H04W 84/047; H04W 72/042
See application file for complete search history.

(56) References Cited

U.S. PATENT DOCUMENTS

| | | | |
|---|---|---|---|
| 2019/0297555 A1* | 9/2019 | Hampel | H04L 47/58 |
| 2020/0015147 A1* | 1/2020 | Malkamaki | H04W 40/36 |
| 2021/0105795 A1* | 4/2021 | Zhu | H04W 40/34 |
| 2021/0266815 A1* | 8/2021 | Wei | H04W 40/02 |
| 2021/0377784 A1* | 12/2021 | Marco | H04L 47/30 |

OTHER PUBLICATIONS

3GPP TR 38.874 v0.3.2, "3GPP; TSGRAN; Study on Integrated Access and Backhaul; (Release 15)," Jun. 21, 2018, See sections 3.1, 6.3.1.1, 6.4.1.1, 8.2.1, 8.2.2; and figures 6.4.1-1, 8.2-1.
Sequans Communications, "Flow control consideration for IAB," R2-1810451, 3GPP TSG-RAN WG2#NR AH1807, Montreal, Canada, Jun. 22, 2018, See sections 2.1-2.2.1; and figures 2, 4.
Section 6 of 3GPP TS 38.401 V15.2.0, Jun. 2018.
Sections 5.2 and 7.1 of 3GPP TS 38.470 V15.1.0, Mar. 2018.

* cited by examiner

METHOD AND APPARATUS FOR SUPPORTING LINK CONGESTION DETECTION IN WIRELESS COMMUNICATION SYSTEM

This application is the National Stage filing under 35 U.S.C. 371 of International Application No. PCT/KR2019/009000, filed on Jul. 22, 2019, which claims the benefit of Korean Patent Applications No. 10-2018-0085010 filed on Jul. 20, 2018 and No. 10-2019-0017475 filed on Feb. 14, 2019, the contents of which are all hereby incorporated by reference herein in their entirety.

TECHNICAL FIELD

The present invention relates to wireless communication and, more particularly, to a method and apparatus for supporting a link congestion detection in a wireless communication system, specifically in an integrated access and backhaul (IAB) network.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

One of the potential technologies targeted to enable future cellular network deployment scenarios and applications is the support for wireless backhaul and relay links enabling flexible and very dense deployment of NR cells without the need for densifying the transport network proportionately.

Due to the expected larger bandwidth available for NR compared to LTE (e.g. mmWave spectrum) along with the native deployment of massive multiple-input multiple-output (MIMO) or multi-beam systems in NR creates an opportunity to develop and deploy integrated access and backhaul (IAB) links. This may allow easier deployment of a dense network of self-backhauled NR cells in a more integrated manner by building upon many of the control and data channels/procedures defined for providing access to user equipments (UEs). Due to deployment of IAB links, relay nodes (relay transmission/reception points (rTRPs)) can multiplex access and backhaul links in time, frequency, or space (e.g. beam-based operation).

The operation of the different links may be on the same or different frequencies (also termed 'in-band' and 'out-band' relays). While efficient support of out-band relays is important for some NR deployment scenarios, it is critically important to understand the requirements of in-band operation which imply tighter interworking with the access links operating on the same frequency to accommodate duplex constraints and avoid/mitigate interference.

In addition, operating NR systems in mmWave spectrum presents some unique challenges including experiencing severe short-term blocking that may not be readily mitigated by present radio resource control (RRC)-based handover mechanisms due to the larger time-scales required for completion of the procedures compared to short-term blocking. Overcoming short-term blocking in mmWave systems may require fast radio access network (RAN)-based mechanisms for switching between rTRPs, which do not necessarily require involvement of the core network. The above described need to mitigate short-term blocking for NR operation in mmWave spectrum along with the desire for easier deployment of self-backhauled NR cells creates a need for the development of an integrated framework that allows fast switching of access and backhaul links. Over-the-air (OTA) coordination between rTRPs can also be considered to mitigate interference and support end-to-end route selection and optimization.

SUMMARY

IAB network consists of an IAB-donor and IAB-node(s) which have the relation of gNB central unit (gNB-CU) and gNB distributed unit (gNB-DU) defined in 5G NR. The requirements for IAB design such as multi-hop and redundant connectivity, and end-to-end routing selection and optimization should be addressed.

In CU-DU split, the gNB-DU can provide the gNB-CU with the feedback for whether data traffic is transmitted or not to the UE which has the RRC connection with the gNB-DU. However, if the IAB-donor-CU and the IAB-node in which some problem (e.g. link congestion or blockage) occurs have multi-hop connection, the IAB-donor-CU may not identify what problem occurs at that IAB-node. So, the IAB-donor-CU may not establish a proper path for transmission of data traffic.

Also, because many-to-one mapping between UE data radio bearers (DRB(s)) and/or backhaul (BH) radio link control (RLC)-channel(s) and BH RLC-channel is possible, even though the IAB-donor-CU receives feedback information, the IAB-donor-CU may not identify the IAB-node in which some problem happens.

Therefore, the solution that the IAB-node which has multi-hop connection with the IAB-donor-CU can notify the IAB-donor-CU of its current status or problem is necessary.

In an aspect, a method performed by a central unit (CU) of an integrated access and backhaul (IAB)-donor gNB in a wireless communication system is provided. The method includes performing downlink (DL) transmission, receiving information about a problem on a backhaul (BH)-radio link control (RLC) channel between a first IAB-node and a second IAB-node, and stopping the DL transmission to the second IAB-node via the BH-RLC channel between the first IAB-node and the second IAB-node based on the information. The IAB-donor gNB is a gNB that provides functionality to support BH-RLC channels for IAB-nodes including the first IAB-node and the second IAB-node. Each of the first IAB-node and the second IAB-node includes a distributed unit (DU) which is a logical node hosting a radio link control (RLC) layer, a media access control (MAC) layer and a physical layer.

In another aspect, a method performed by a distributed unit (DU) of an integrated access and backhaul (IAB)-donor gNB in a wireless communication system is provided. The method includes performing downlink (DL) transmission, receiving information about a problem on a backhaul (BH)-radio link control (RLC) channel between a first IAB-node and a second IAB-node, and forwarding the received information to a CU of the IAB-donor gNB. The IAB-donor gNB is a gNB that provides functionality to support BH-RLC channels for IAB-nodes including the first IAB-node and the second IAB-node. Each of the first IAB-node and the second IAB-node includes a distributed unit (DU) which is a logical node hosting a radio link control (RLC) layer, a media access control (MAC) layer and a physical layer.

Congestion and/or blockage of backhaul link can be detected and indicated to the IAB-donor-CU. Therefore, an appropriate path for transmission of data traffic can be established.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
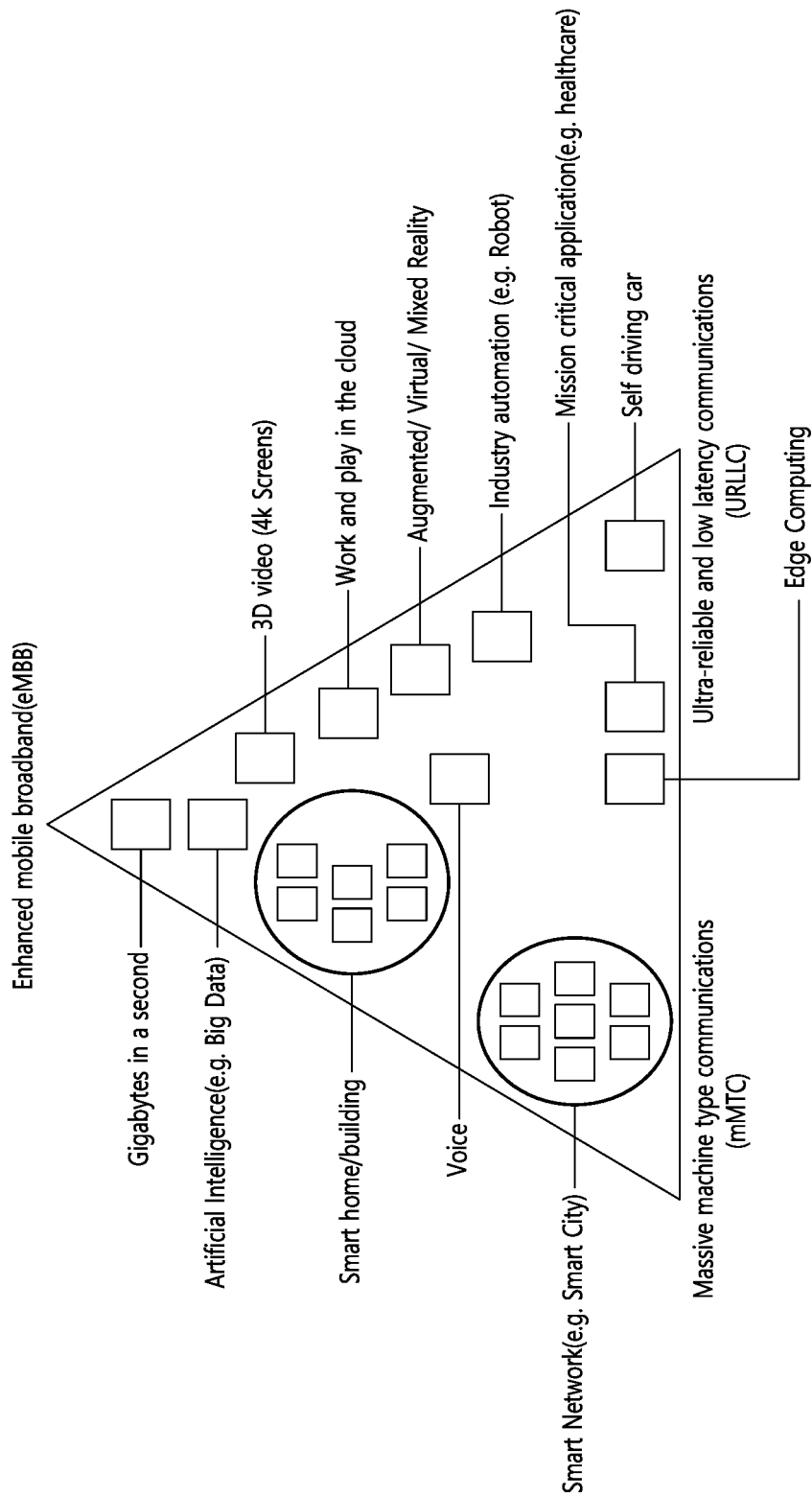
FIG. 1 shows examples of 5G usage scenarios to which the technical features of the present invention can be applied.

FIG. 1 shows examples of 5G usage scenarios to which the technical features of the present invention can be applied.

The 5G usage scenarios shown in FIG. 1 are only exemplary, and the technical features of the present invention can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities.

Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
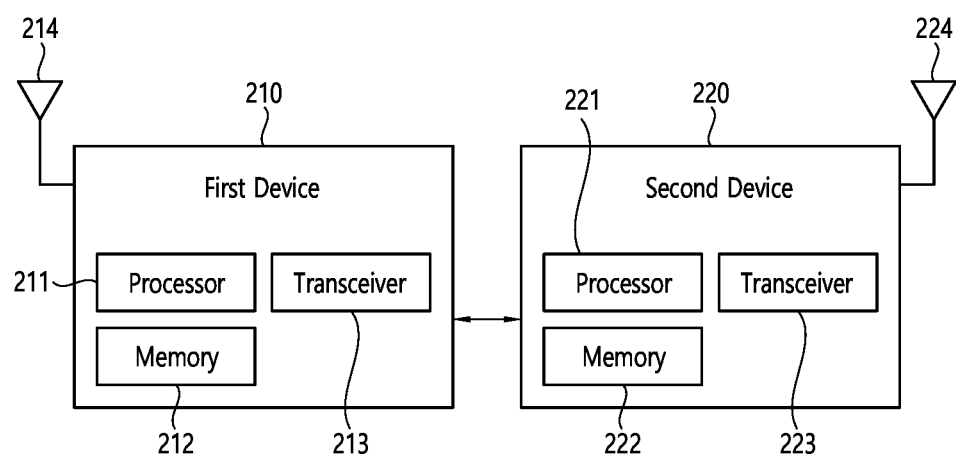
FIG. 2 shows an example of a wireless communication system to which the technical features of the present invention can be applied.

FIG. 2 shows an example of a wireless communication system to which the technical features of the present invention can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present invention described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present invention described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
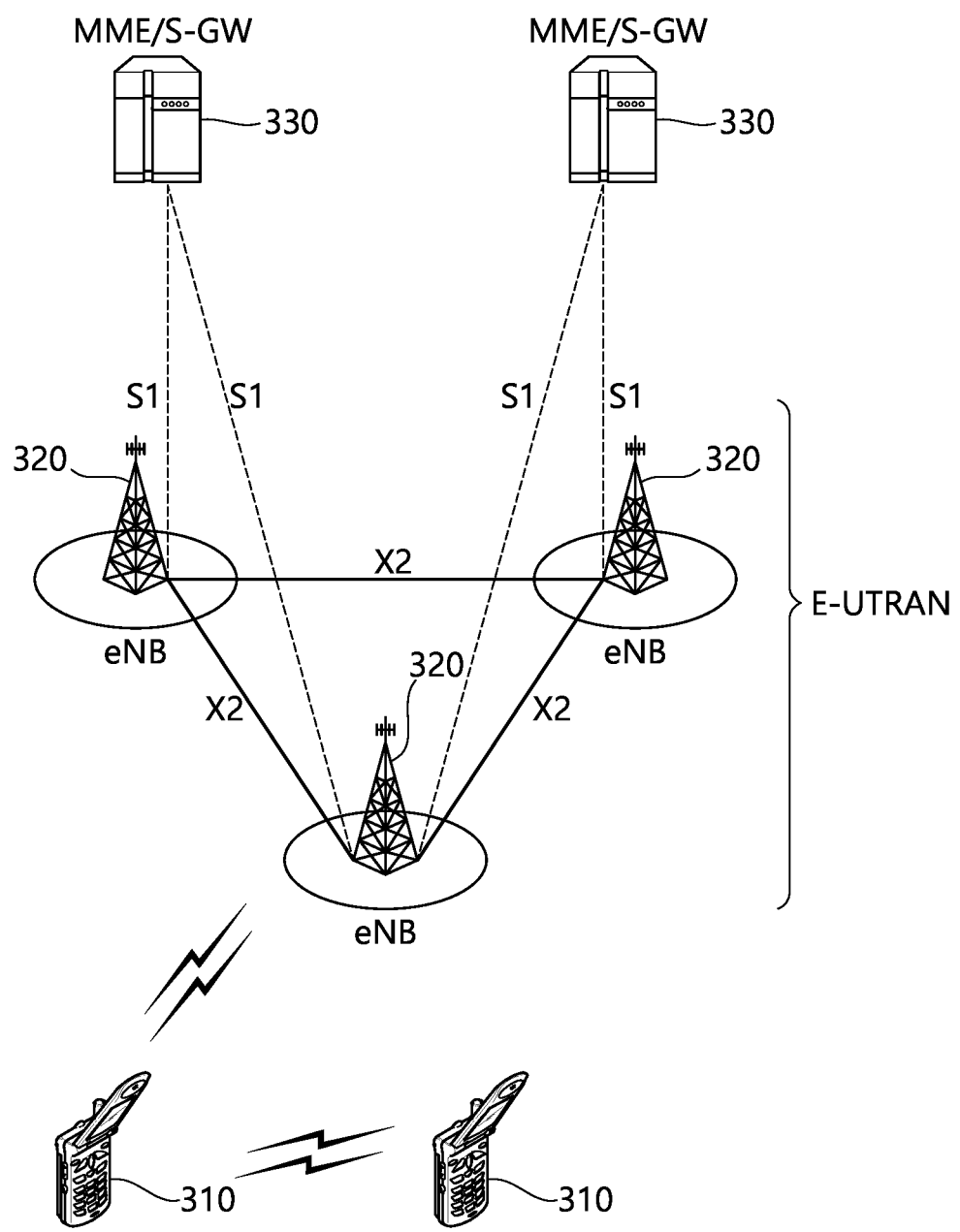
FIG. 3 shows an example of a wireless communication system to which the technical features of the present invention can be applied.

FIG. 3 shows an example of a wireless communication system to which the technical features of the present invention can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310.

The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
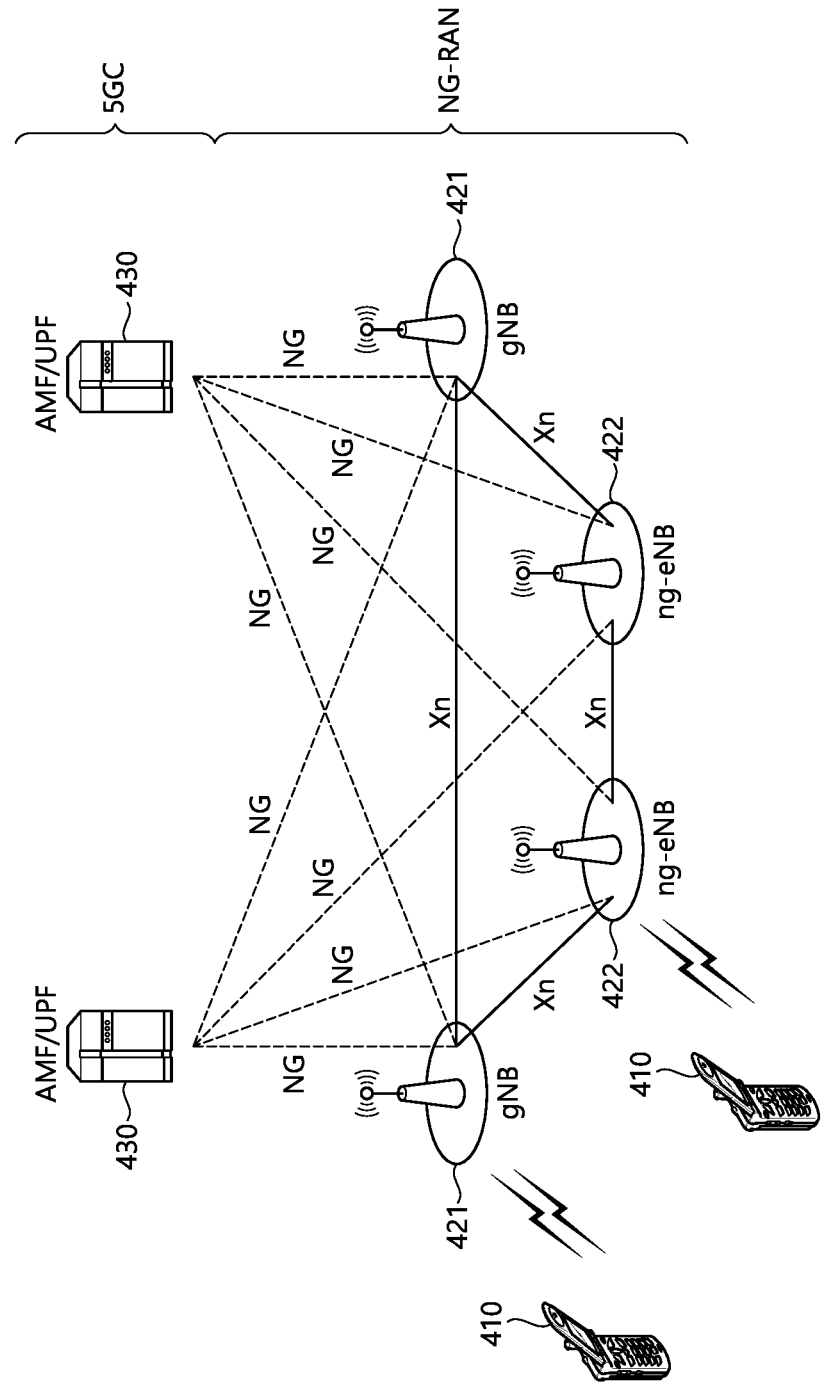
FIG. 4 shows another example of a wireless communication system to which the technical features of the present invention can be applied.

FIG. 4 shows another example of a wireless communication system to which the technical features of the present invention can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
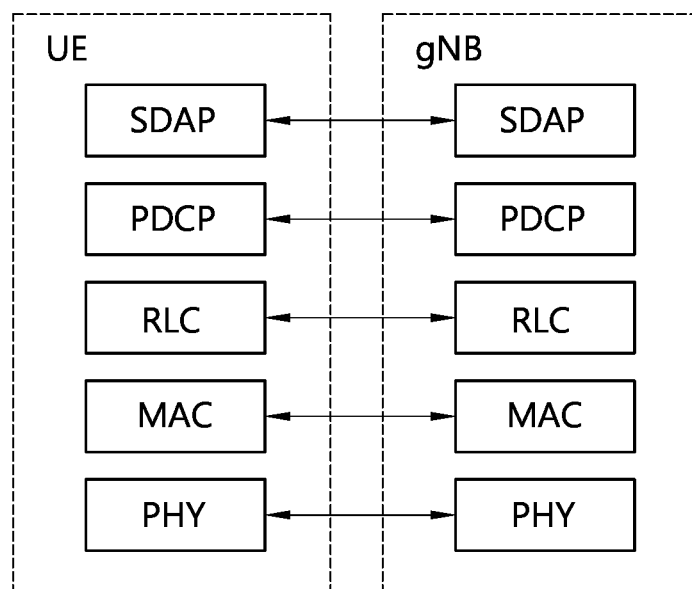
FIG. 5 shows a block diagram of a user plane protocol stack to which the technical features of the present invention can be applied.
Figure 6:
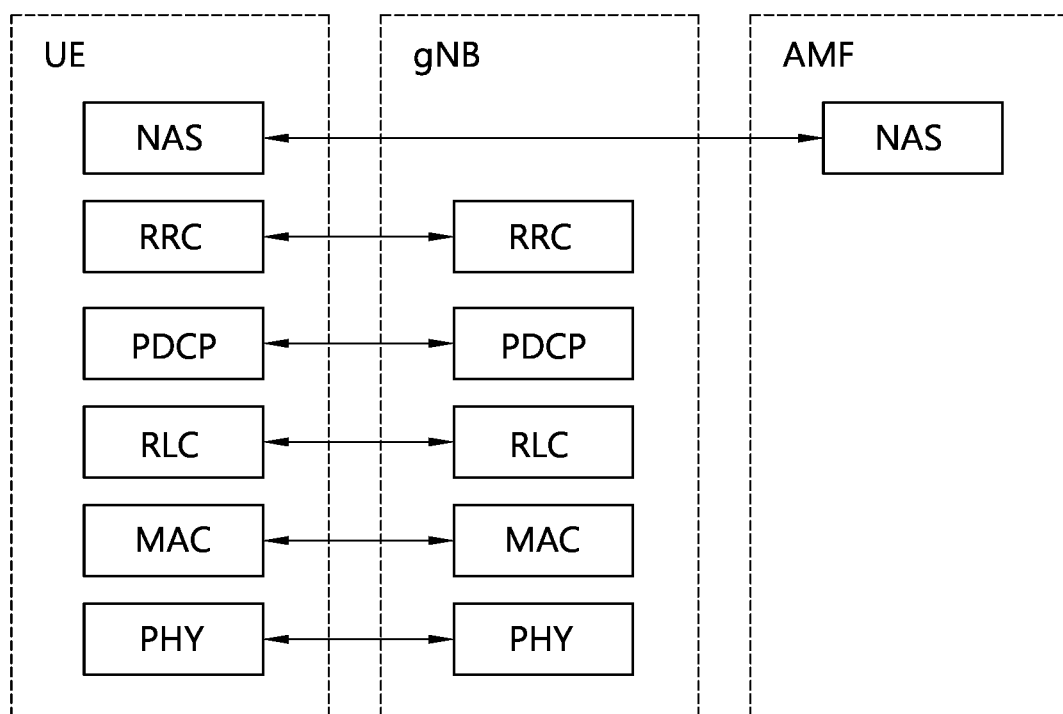
FIG. 6 shows a block diagram of a control plane protocol stack to which the technical features of the present invention can be applied.

FIG. 5 shows a block diagram of a user plane protocol stack to which the technical features of the present invention can be applied. FIG. 6 shows a block diagram of a control plane protocol stack to which the technical features of the present invention can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

Split of gNB central unit (gNB-CU) and gNB distributed unit (gNB-DU) is described. Section 6 of 3GPP TS 38.401 V15.2.0 (2018 June) and Sections 5.2 and 7.1 of 3GPP TS 38.470 V15.1.0 (2018 March) may be referred.

Figure 7:
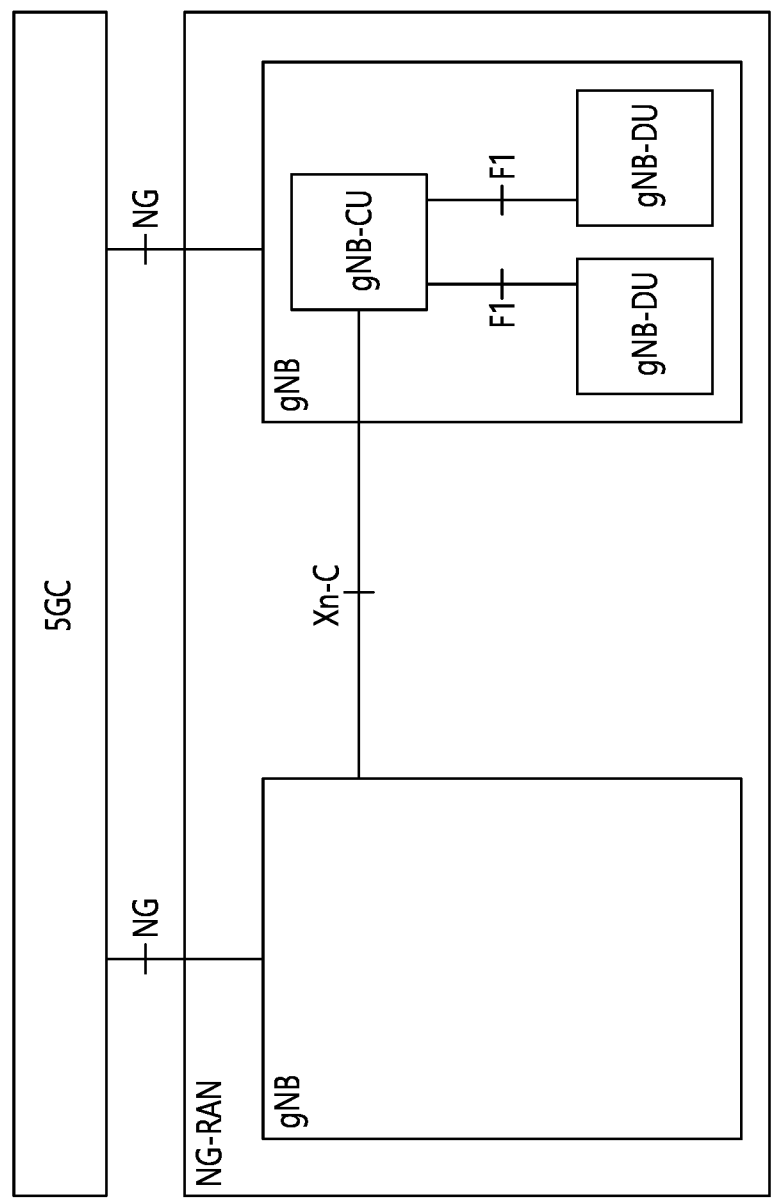
FIG. 7 shows an example of the overall architecture of an NG-RAN to which technical features of the present invention can be applied.

FIG. 7 shows an example of the overall architecture of an NG-RAN to which technical features of the present invention can be applied.

Referring to FIG. 7, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

The F1 setup and gNB-DU configuration update functions allow to inform the single network slice selection assistance information (S-NSSAI) supported by the gNB-DU.

The F1 resource coordination function is used to transfer information about frequency resource sharing between gNB-CU and gNB-DU.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU. For each DRB to be setup or modified, the S-NSSAI may be provided by gNB-CU to the gNB-DU in the UE context setup procedure and the UE context modification procedure.

The mapping between QoS flows and radio bearers is performed by gNB-CU and the granularity of bearer related management over F1 is radio bearer level. For NG-RAN, the gNB-CU provides an aggregated DRB QoS profile and QoS flow profile to the gNB-DU, and the gNB-DU either accepts the request or rejects it with appropriate cause value. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

(5) Paging Function

The gNB-DU is responsible for transmitting the paging information according to the scheduling parameters provided.

The gNB-CU provides paging information to enable the gNB-DU to calculate the exact paging occasion (PO) and paging frame (PF). The gNB-CU determines the paging assignment (PA). The gNB-DU consolidates all the paging records for a particular PO, PF and PA, and encodes the final RRC message and broadcasts the paging message on the respective PO, PF in the PA.

(6) Warning Messages Information Transfer Function

This function allows to cooperate with the warning message transmission procedures over NG interface. The gNB-CU is responsible for encoding the warning related SI message and sending it together with other warning related information for the gNB-DU to broadcast over the radio interface.

Figure 8:
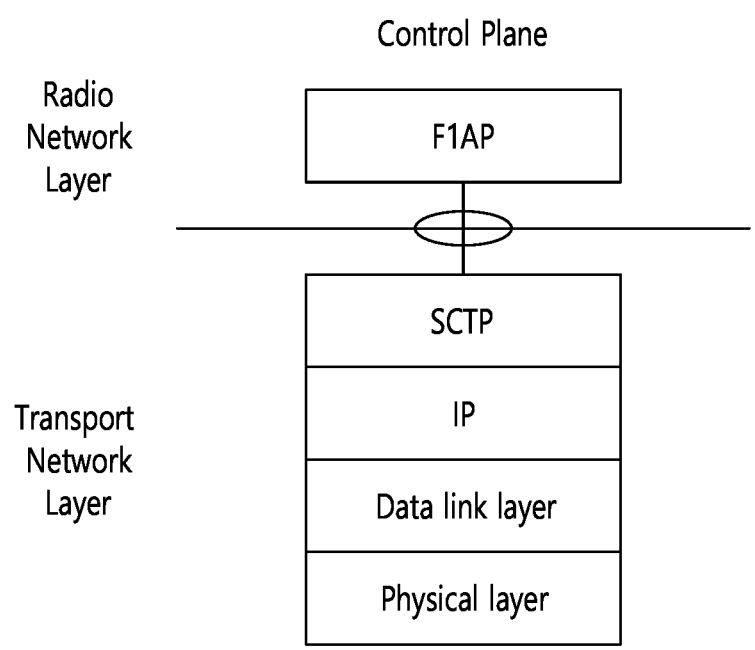
FIG. 8 shows an interface protocol structure for F1-C to which technical features of the present invention can be applied.

FIG. 8 shows an interface protocol structure for F1-C to which technical features of the present invention can be applied.

A transport network layer (TNL) is based on Internet protocol (IP) transport, comprising a stream control transmission protocol (SCTP) layer on top of the IP layer. An application layer signaling protocol is referred to as an F1 application protocol (E1AP).

Integrated access and backhaul (IAB) is described. Section 6 of 3GPP TR 38.874 V0.3.2 (2018 June) can be referred.

IAB-node is a node that provides functionality to support connectivity to the network for the UE via an NR backhaul. IAB-node is a RAN node that supports wireless access to UEs and wirelessly backhauls the access traffic. IAB-donor (or IAB-donor gNB) is a gNB that provides functionality to support an NR backhaul for IAB-nodes. IAB-donor is a RAN node which provides UE's interface to core network and wireless backhauling functionality to IAB-nodes. The IAB-donor and IAB-node(s) may have the relation of gNB-CU and gNB-DU. IAB-donor-CU is the gNB-CU of an IAB-donor gNB, terminating the F1 interface towards IAB-nodes and IAB-donor-DU. IAB-donor-DU is the gNB-DU of an IAB-donor gNB, hosting the IAB backhaul adaptation protocol (BAP) layer, providing wireless backhaul to IAB-nodes. NR backhaul link is NR link used for backhauling between an IAB-node to an IAB-donor, and between IAB-nodes in case of a multi-hop network. The NR backhaul link may be called other names, such as backhaul (BH) RLC channel.

IAB strives to reuse existing functions and interfaces defined for access. In particular, mobile-termination (MT), gNB-DU, gNB-CU, UPF, AMF and SMF as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion. Additional functionality such as multi-hop forwarding is included in the architecture discussion as it is necessary for the understanding of IAB operation and since certain aspects may require standardization.

The MT function has been defined a component of the mobile equipment. MT is referred to as a function residing on an IAB-node that terminates the radio interface layers of the backhaul Uu interface toward the IAB-donor or other IAB-nodes.

Figure 9:
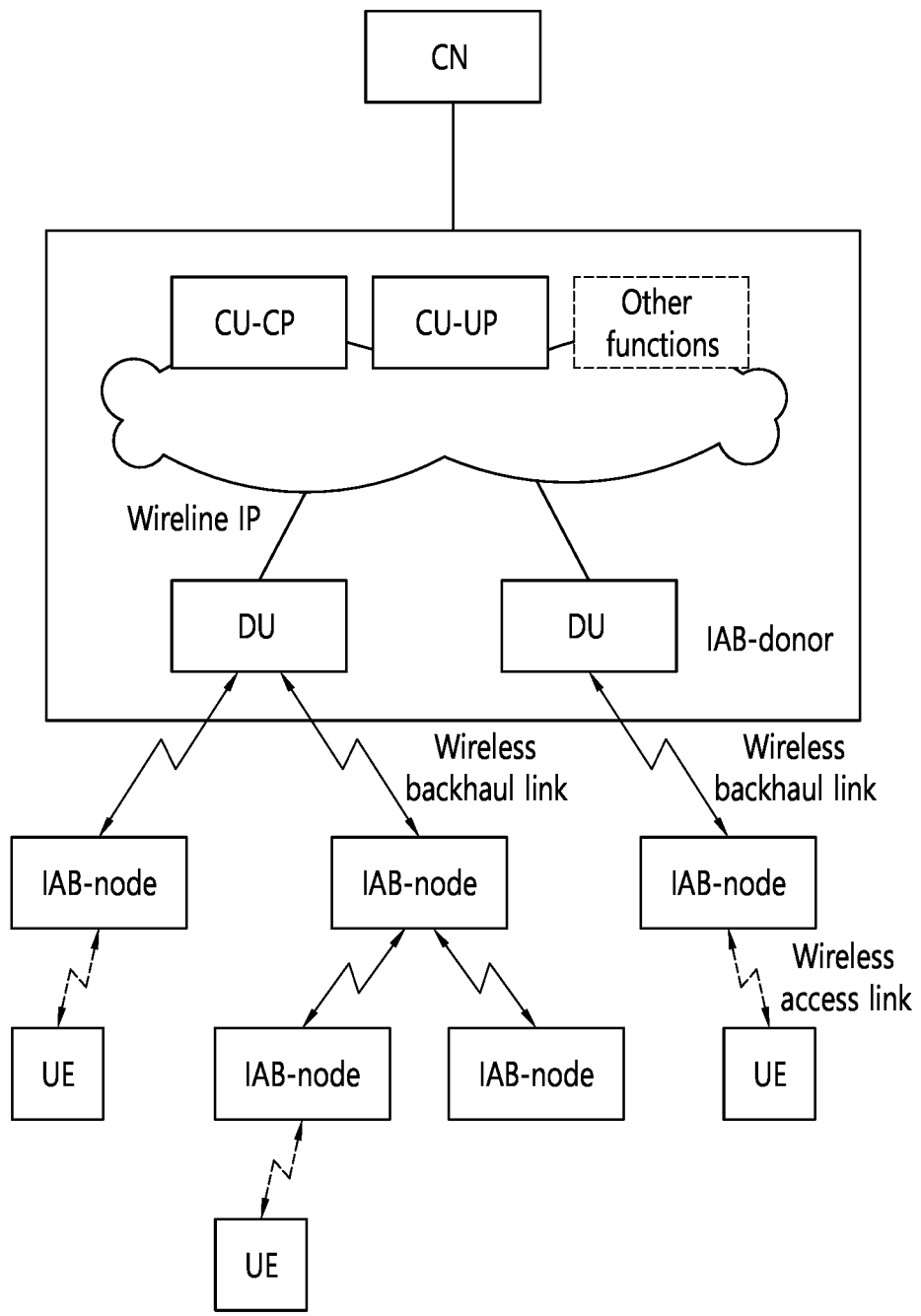
FIG. 9 shows a reference diagram for IAB in standalone mode, which contains one IAB-donor and multiple IAB-nodes, to which the technical features of the present invention can be applied.

FIG. 9 shows a reference diagram for IAB in standalone mode, which contains one IAB-donor and multiple IAB-nodes, to which the technical features of the present invention can be applied.

The IAB-donor is treated as a single logical node that comprises a set of functions such as gNB-DU, gNB-CU control plane (gNB-CU-CP), gNB-CU user plane (gNB-CU-UP) and potentially other functions. In a deployment, the IAB-donor can be split according to these functions, which can all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks.

Figure 10:
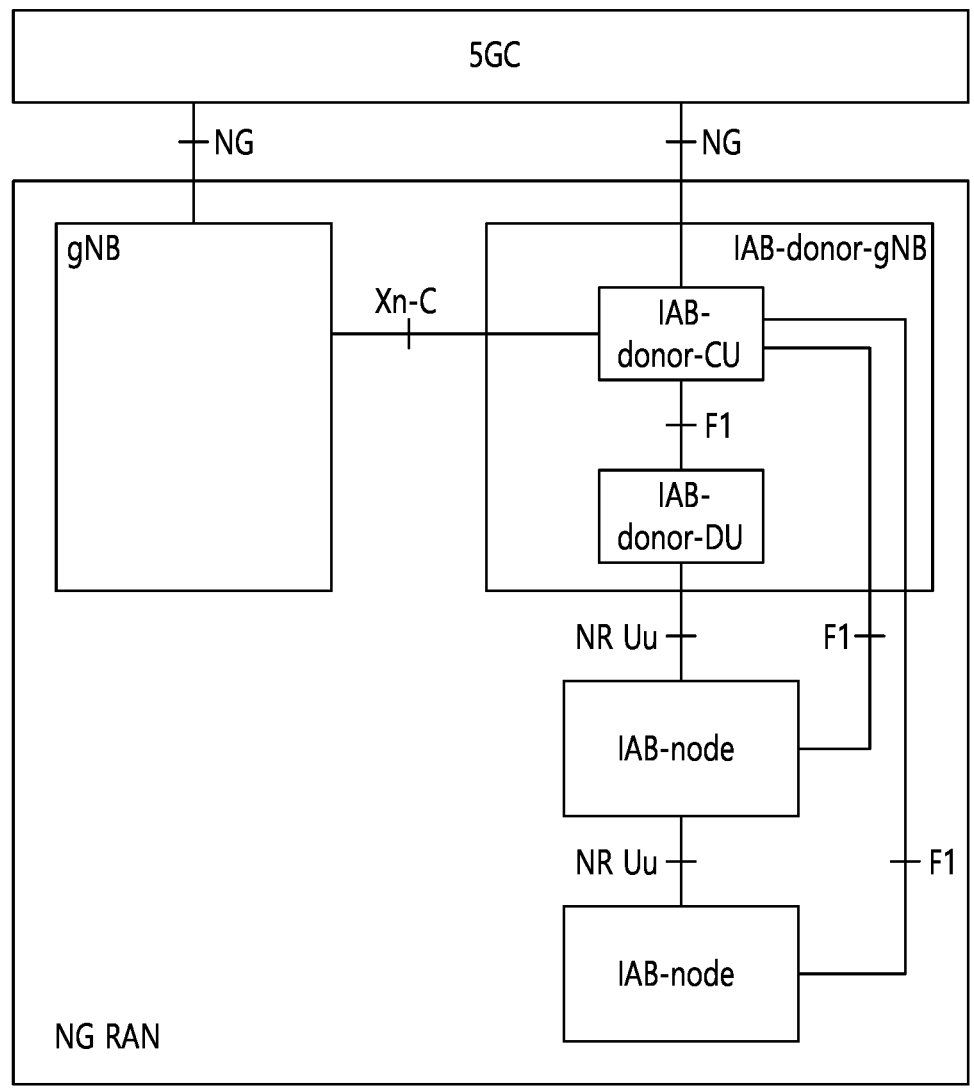
FIG. 10 shows an example of overall architecture of IAB to which the technical features of the present invention can be applied.

FIG. 10 shows an example of overall architecture of IAB to which the technical features of the present invention can be applied.

The NG-RAN supports IAB by the IAB-node wirelessly connecting to the gNB capable of serving the IAB-nodes, named IAB-donor gNB.

The IAB-donor gNB consists of an IAB-donor-CU and one or more IAB-donor-DU(s). In case of separation of gNB-CU-CP and gNB-CU-UP, the IAB-donor gNB may consist of an IAB-donor-CU-CP, multiple IAB-donor-CU-UPs and multiple IAB-donor-DUs.

The IAB-node connects to an upstream IAB-node or an IAB-donor-DU via a subset of the UE functionalities of the NR Uu interface (named IAB-MT function of IAB-node). The IAB-node provides wireless backhaul to the downstream IAB-nodes and UEs via the network functionalities of the NR Uu interface (named IAB-DU function of IAB-node).

The F1-C traffic towards an IAB-node is backhauled via the IAB-donor-DU and the optional intermediate IAB-node(s).

The F1-U traffic towards an IAB-node is backhauled via the IAB-donor-DU and the optional intermediate IAB-node(s).

All functions specified for a gNB-DU are equally applicable for an IAB-node and IAB-donor-DU unless otherwise stated, and all functions specified for a gNB-CU are equally applicable for an IAB-donor-CU, unless otherwise stated. All functions specified for the UE context are equally applicable for managing the context of IAB-node MT functionality, unless otherwise stated.

The requirements for IAB design such as multi-hop and redundant connectivity, and end-to-end routing selection and optimization, should be addressed. For example, considering these requirements, the IAB-node may have multi-hop connection with the IAB-donor-CU.

Meanwhile, in CU-DU split, the DU which has a single hop connection with the CU may provide the CU with feedback for whether data traffic is transmitted or not to the UE in RRC_CONNECTED. But, there is not current mechanism for the IAB-node which has multi-hop connection with the IAB-donor-CU providing feedback for whether data traffic is transmitted or not to the UE to the IAB-donor-CU. So, if the IAB-donor-CU and the IAB-node in which some problem occurs have multi-hop connection, the IAB-donor-CU may not identify what problem occurs at that IAB-node. Because the IAB-donor-CU may not receive the feedback by the IAB-node in which some problem occurs, the IAB-donor-CU cannot establish a proper path for transmission of data traffic. Also, because many-to-one mapping between UE DRB(s) and/or backhaul (BH) RLC-channel(s) and BH RLC-channel is possible, even though the IAB-donor-CU receives feedback from the IAB-node in which some problem occurs, the IAB-donor-CU may not identify the IAB-node in which some problem happens. Therefore, the solution that the IAB-node which has multi-hop connection with the IAB-donor-CU can notify the IAB-donor-CU of its current status or problem may be necessary.

Figure 11:
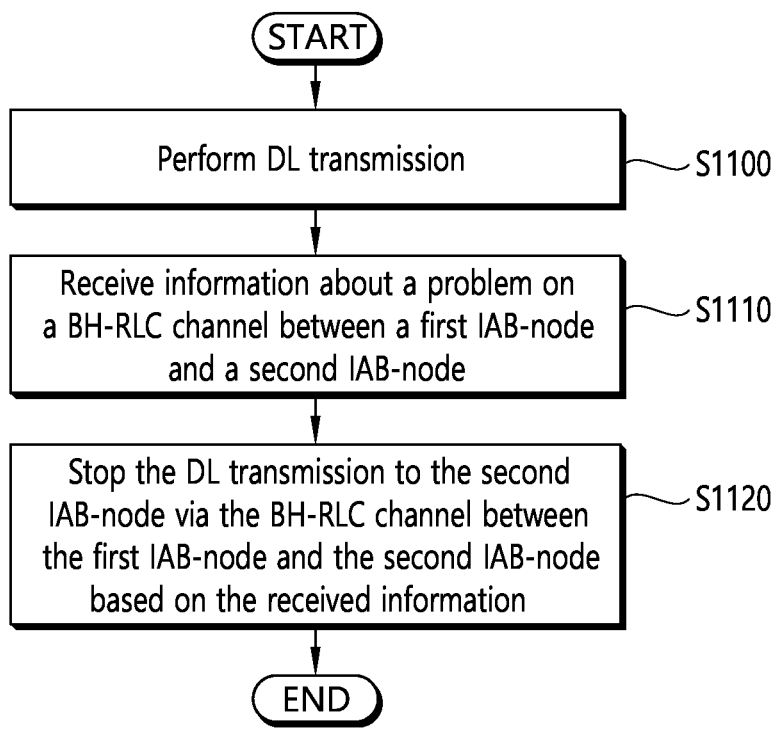
FIG. 11 shows an example of a method for supporting a link congestion detection performed by an IAB-donor-CU according to an embodiment of the present invention.

FIG. 11 shows an example of a method for supporting a link congestion detection performed by an IAB-donor-CU according to an embodiment of the present invention.

Hereinafter, the IAB-donor gNB is a gNB that provides functionality to support BH-RLC channels for IAB-nodes including the first IAB-node and the second IAB-node. Each of the first IAB-node and the second IAB-node includes a DU which is a logical node hosting RLC layer, MAC layer and a physical layer. The first IAB-node may be an upstream IAB-node of the second IAB-node, and the second IAB-node may be a downstream IAB-node of the first IAB-node.

In step S1100, the IAB-donor-CU performs DL transmission, e.g. towards the second IAB-node.

In step S1110, the IAB-donor-CU receives information about a problem on a BH-RLC channel between the first IAB-node and the second IAB-node.

The information may include that the BH-RLC channel between the first IAB-node and the second IAB-node is congested. The information may include that the BH-RLC channel between the first IAB-node and the second IAB-node is blocked. The information may include an ID, e.g. IP address, of at least one of the first IAB-node and/or the second IAB-node. The information may include an ID, e.g. IP address, of the CU of the IAB-donor gNB.

The information may be received from the first IAB-node going through a DU of the IAB-donor gNB. The information may be received via a downlink data delivery status frame. Or, the information may be received via a feedback indication message, and the feedback indication message may include information related to a transmission status of the DL transmission via the BH-RLC channel between the first IAB-node and the second IAB-node. The information related to the transmission status of the DL transmission may include at least one of a highest successfully PDCP sequence number (SN), a highest transmitted PDCP SN and/or a number of lost SN ranges.

In step S1120, the IAB-donor-CU stops (and/or reduces) the DL transmission to the second IAB-node via the BH-RLC channel between the first IAB-node and the second IAB-node based on the information. The IAB-donor-CU may select a path towards the second IAB-node other than the BH-RLC channel between the first IAB-node and the second IAB-node, and perform DL transmission towards the second IAB-node via the selected path.

According to the embodiment of the present invention shown in FIG. 11, the IAB-node which has multi-hop connection with the IAB-donor-CU can inform the IAB-donor-CU of congestion and/or blockage of BH-RLC channel. Therefore, the IAB-donor-CU can establish an appropriate path for transmission of data traffic towards the IAB-node by avoiding the BH-RLC channel on which congestion and/or blockage occurs. Consequently, the IAB-donor-CU can perform flow control of IAB network.

Figure 12:
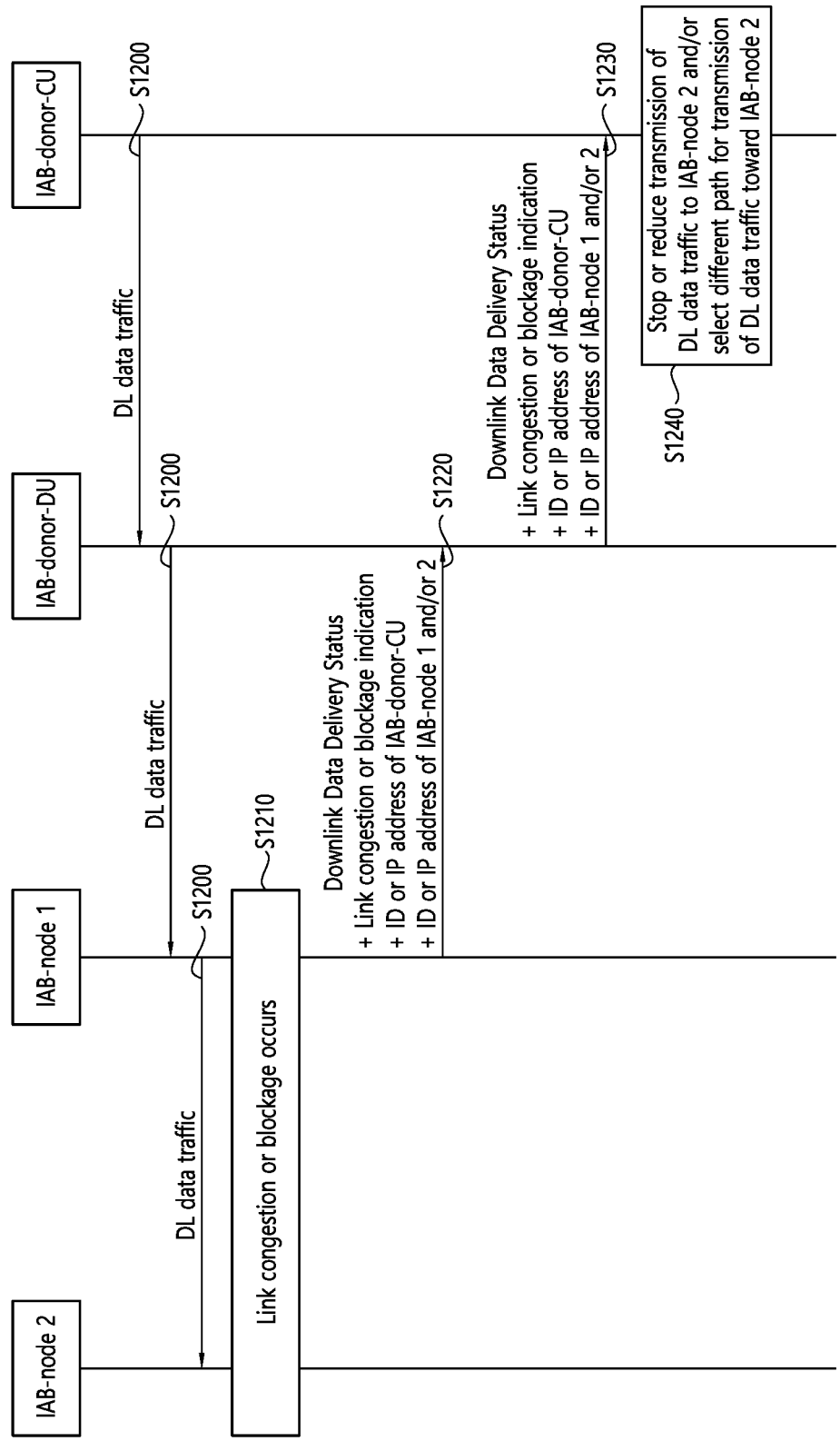
FIG. 12 shows an example of a method for indicating link congestion and/or blockage between IAB-nodes according to an embodiment of the present invention.

FIG. 12 shows an example of a method for indicating link congestion and/or blockage between IAB-nodes according to an embodiment of the present invention.

In this embodiment, when the first IAB-node detects link congestion and/or blockage between the first IAB-node and the second IAB-node (e.g. next hop's IAB-node), the first IAB-node indicates link congestion and/or blockage to the IAB-donor-CU via at least one of IAB-donor-DU, other IAB-node(s) and/or IAB-donor-CU-UP on routing path for transmission of data traffic. Furthermore, the first IAB-node may indicate an identity of IAB-node(s), e.g. IP address, related to the indicated situation (e.g. congestion and/or blockage) to the IAB-donor-CU via at least one of IAB-donor-DU, other IAB-node(s) and/or IAB-donor-CU-UP on routing path for transmission of data traffic. Upon receiving the indication from the first IAB-node, the IAB-donor-CU can establish an appropriate path for transmission of data traffic. Furthermore, upon receiving the indication from the first IAB-node, the IAB-donor-CU can stop and/or reduce transmission of DL data traffic toward the IAB-node in which link congestion and/or blockage occurs. The IAB-donor may be split into IAB-donor-CU and IAB-donor-DU. The IAB-donor-CU may be split into IAB-donor-CU-CP and IAB-donor-CU-UP.

In step S1200, the IAB-donor-CU sends the DL user data/DL data traffic to the IAB-node 2 via IAB-donor-DU and the IAB-node 1.

In step S1210, congestion and/or blockage occurs for link (i.e. BH-RLC channel) between the IAB-node 1 and the IAB-node 2.

In step S1220, upon detecting link congestion and/or blockage, the IAB-node 1 transmits a Downlink Data Delivery Status frame to the IAB-donor-DU. The Downlink Data Delivery Status frame includes link congestion indication and/or link blockage indication, in order to indicate this situation. The Downlink Data Delivery Status frame may further include ID and/or IP address of at least one of the IAB-node 1 and/or IAB-node 2, in order to notify the IAB-donor-CU that link congestion and/or blockage occurs between the IAB-node 1 and IAB-node 2. The Downlink Data Delivery Status frame may further include ID and/or IP address of the IAB-donor-CU, in order to notify that the final destination to which the link congestion and/or blockage indication should be transmitted is the IAB-donor-CU. The Downlink Data Delivery Status frame may be replaced with other frames, such as Assistance Information Data frame or new frame.

In step S1230, upon receiving the Downlink Data Delivery Status frame from the IAB-node 1, the IAB-donor-DU transmits and/or forwards the received Downlink Data Delivery Status frame including the link congestion indication and/or link blockage indication to the IAB-donor-CU. The IAB-donor-DU may transmit and/or forward the received Downlink Data Delivery Status frame including the link congestion indication and/or link blockage indication to the IAB-donor-CU based on the ID and/or IP address of the IAB-donor-CU included in the Downlink Data Delivery Status frame. The Downlink Data Delivery Status frame may further include ID and/or IP address of at least one of the IAB-node 1 and/or IAB-node 2, in order to notify the IAB-donor-CU that link congestion and/or blockage occurs between the IAB-node 1 and IAB-node 2. The Downlink Data Delivery Status frame may further include ID and/or IP address of the IAB-donor-CU, in order to notify that the final destination to which the link congestion and/or blockage indication should be transmitted is the IAB-donor-CU.

In case that the IAB-donor-CU is split into the IAB-donor-CU-CP and IAB-donor-CU-UP, the IAB-donor-DU may transmit and/or forward the received Downlink Data Delivery Status frame including the link congestion indication and/or link blockage indication to the IAB-donor-CU-UP. The IAB-donor-CU-UP may additionally transmit an existing message and/or a new message containing the contents included in the Downlink Data Delivery Status frame received from the IAB-donor-DU to the IAB-donor-CU-CP.

In step S1240, upon receiving the Downlink Data Delivery Status frame from the IAB-donor-DU, the IAB-donor-CU may stop and/or reduce transmission of DL user data/DL data traffic towards the IAB-node 2. The IAB-donor-CU may stop and/or reduce transmission of DL user data/DL data traffic towards the IAB-node 2 based on the ID and/or IP address of at least one of the IAB-node 1 and/or IAB-node 2 included in the Downlink Data Delivery Status frame. In case that the IAB-donor-CU is split into the IAB-donor-CU-CP and IAB-donor-CU-UP, the IAB-donor-CU-CP may send to the IAB-donor-CU-UP Bearer Context Modification Request message (or new message) including an indication for stopping and/or reducing transmission of DL user data/DL data traffic towards the IAB-node 2.

Then, the IAB-donor-CU(-CP) may find different path for transmission of DL user data/DL data traffic towards the IAB-node 2, other than the BH-RLC channel between the IAB-node 1 and IAB-node 2. For example, in order to find appropriate path for transmitting DL user data/DL data traffic towards the IAB-node 2, IAB-donor-CU(-CP) may perform the UE Context Setup/Modification procedure with the IAB-donor-DU and/or IAB-nodes which have F1 connection with the IAB-donor-CU(-CP). In case that the IAB-donor-CU is split into the IAB-donor-CU-CP and IAB-donor-CU-UP, the IAB-donor-CU-CP may additionally perform the Bearer Context Setup/Modification procedure with IAB-donor-CU-UP.

If the different/new path is found/selected, the IAB-donor-CU(-CP) may transmit routing information related to sending the DL user data/DL data traffic to the IAB-donor-DU and IAB-node(s) on routing path which the DL user data/DL data traffic is delivered. In case that the IAB-donor-CU is split into the IAB-donor-CU-CP and IAB-donor-CU-UP, the IAB-donor-CU-CP may additionally transmit the routing information related to sending the DL user data/DL data traffic to the IAB-donor-CU-UP on routing path which the DL user data/DL data traffic is delivered.

Then, based on information (e.g. highest successfully delivered NR PDCP SN, highest transmitted NR PDCP SN or Number of lost NR-U SN ranges reported, etc.) which may be received from the IAB-donor-DU, the IAB-donor-CU transfers the DL user data/DL data traffic through new selected path towards the IAB-node 2. In case that the IAB-donor-CU is split into the IAB-donor-CU-CP and IAB-donor-CU-UP, the IAB-donor-CU-CP may send an existing message and/or new message including an indication for instructing the IAB-donor-CU-UP to transmit the DL user data/DL data traffic through new selected path towards the IAB-node 2 and/or the information (e.g. highest successfully delivered NR PDCP SN, highest transmitted NR PDCP SN or Number of lost NR-U SN ranges reported, etc.).

According to the embodiment of the present invention shown in FIG. 12, the IAB-donor-CU(-CP) can know that link congestion and/or blockage occurs between which IAB-nodes through the user plane based feedback to be provided. So, the IAB-donor-CU(-CP) can find an appropriate path for transmitting DL data traffic towards the UE via newly selected IAB-node(s). Furthermore, the IAB-donor-CU(-CP) can stop and/or reduce transmission of DL data traffic towards the IAB-node in which link congestion and/or blockage happens. Therefore, UE's experience can be enhanced and the IAB-donor-CU(-CP) can handle data packets better for a specific UE through the proper multi-hop path and/or the control for transmitting DL data traffic.

Figure 13:
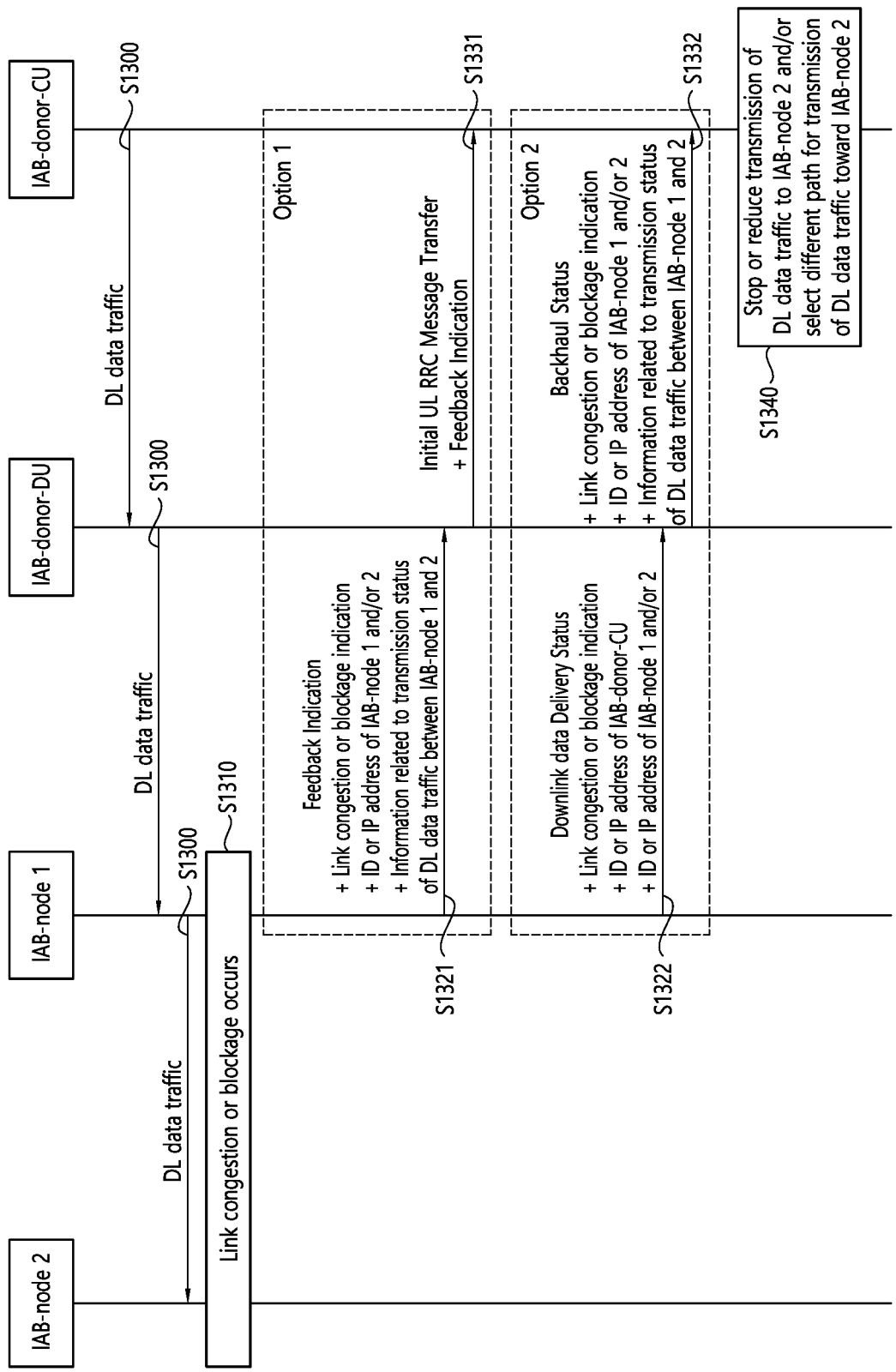
FIG. 13 shows another example of a method for indicating link congestion and/or blockage between IAB-nodes according to an embodiment of the present invention.

FIG. 13 shows another example of a method for indicating link congestion and/or blockage between IAB-nodes according to an embodiment of the present invention.

In this embodiment, when the first IAB-node detects link congestion and/or blockage between the first IAB-node and the second IAB-node (e.g. next hop's IAB-node), the first IAB-node indicates link congestion and/or blockage to the IAB-donor-CU via at least one of IAB-donor-DU and/or other IAB-node(s) on routing path for transmission of data traffic. Furthermore, the first IAB-node may indicate an identity of IAB-node(s), e.g. IP address, related to the indicated situation (e.g. congestion and/or blockage) to the IAB-donor-CU via at least one of IAB-donor-DU and/or other IAB-node(s) on routing path for transmission of data traffic. Upon receiving the indication from the first IAB-node, the IAB-donor-CU can establish an appropriate path for transmission of data traffic. Furthermore, upon receiving the indication from the first IAB-node, the IAB-donor-CU can stop and/or reduce transmission of DL data traffic toward the IAB-node in which link congestion and/or blockage occurs. The IAB-donor may be split into IAB-donor-CU and IAB-donor-DU. The IAB-donor-CU may be split into IAB-donor-CU-CP and IAB-donor-CU-UP.

In step S1300, the IAB-donor-CU sends the DL user data/DL data traffic to the IAB-node 2 via IAB-donor-DU and the IAB-node 1.

In step S1310, congestion and/or blockage occurs for link (i.e. BH-RLC channel) between the IAB-node 1 and the IAB-node 2.

Upon detecting link congestion and/or blockage, the IAB-node 1 may perform one of the following options.

(1) Option 1

In step S1321, the IAB-node 1 transmits a feedback indication message (which is an RRC message) to the IAB-donor-DU. The feedback indication message includes link congestion indication and/or link blockage indication, in order to indicate this situation. The feedback indication message may further include ID and/or IP address of at least one of the IAB-node 1 and/or IAB-node 2, in order to notify the IAB-donor-CU that link congestion and/or blockage occurs between the IAB-node 1 and IAB-node 2. The feedback indication message may further include information related to transmission status of DL user data/DL data traffic between the IAB-node 1 and the IAB-node 2 (e.g. highest successfully delivered NR PDCP SN, highest transmitted NR PDCP SN or Number of lost NR-U SN ranges reported, etc.) when link congestion and/or blockage occurs. The feedback indication message may be replaced with other messages, e.g. an existing RRC message and/or new RRC message.

In step S1331, upon receiving the feedback indication message from the IAB-node 1, the IAB-donor-DU transmits and/or forwards the received feedback indication message including the link congestion indication and/or link blockage indication to the IAB-donor-CU. The feedback indication may be included in the Initial UL RRC Message Transfer message. The feedback indication message may further include ID and/or IP address of at least one of the IAB-node 1 and/or IAB-node 2, in order to notify the IAB-donor-CU that link congestion and/or blockage occurs between the IAB-node 1 and IAB-node 2.

(2) Option 2

In step S1322, the IAB-node 1 transmits a Downlink Data Delivery Status frame to the IAB-donor-DU. The Downlink Data Delivery Status frame includes link congestion indication and/or link blockage indication, in order to indicate this situation. The Downlink Data Delivery Status frame may further include ID and/or IP address of at least one of the IAB-node 1 and/or IAB-node 2, in order to notify the IAB-donor-CU that link congestion and/or blockage occurs between the IAB-node 1 and IAB-node 2. The Downlink Data Delivery Status frame may further include ID and/or IP address of the IAB-donor-CU, in order to notify that the final destination to which the link congestion and/or blockage indication should be transmitted is the IAB-donor-CU. The Downlink Data Delivery Status frame may be replaced with other frames, such as Assistance Information Data frame or new frame.

In step S1332, upon receiving the Downlink Data Delivery Status frame from the IAB-node 1, the IAB-donor-DU transmits a backhaul status message (which is F1 message) including the link congestion indication and/or link blockage indication to the IAB-donor-CU(-CP). The IAB-donor-DU may transmit the backhaul status message (and/or a new message) including the link congestion indication and/or link blockage indication to the IAB-donor-CU(-CP) based on the ID and/or IP address of the IAB-donor-CU included in the Downlink Data Delivery Status frame. The backhaul status message may further include ID and/or IP address of at least one of the IAB-node 1 and/or IAB-node 2, in order to notify the IAB-donor-CU that link congestion and/or blockage occurs between the IAB-node 1 and IAB-node 2. The backhaul status message may further include information related to transmission status of DL user data/DL data traffic between the IAB-node 1 and the IAB-node 2 (e.g. highest successfully delivered NR PDCP SN, highest transmitted NR PDCP SN or Number of lost NR-U SN ranges reported, etc.) when link congestion and/or blockage occurs. The backhaul status message may be replaced with other messages, e.g. an existing F1 message and/or new F1 message.

In step S1340, upon receiving the feedback indication message (option 1) or the backhaul status message (option 2) from the IAB-donor-DU, the IAB-donor-CU may stop and/or reduce transmission of DL user data/DL data traffic towards the IAB-node 2. The IAB-donor-CU may stop and/or reduce transmission of DL user data/DL data traffic towards the IAB-node 2 based on the ID and/or IP address of at least one of the IAB-node 1 and/or IAB-node 2 included in the feedback indication message and/or the backhaul status message. In case that the IAB-donor-CU is split into the IAB-donor-CU-CP and IAB-donor-CU-UP, the IAB-donor-CU-CP may send to the IAB-donor-CU-UP Bearer Context Modification Request message (or new message) including an indication for stopping and/or reducing transmission of DL user data/DL data traffic towards the IAB-node 2.

Then, the IAB-donor-CU(-CP) may find different path for transmission of DL user data/DL data traffic towards the IAB-node 2, other than the BH-RLC channel between the IAB-node 1 and IAB-node 2. For example, in order to find appropriate path for transmitting DL user data/DL data traffic towards the IAB-node 2, IAB-donor-CU(-CP) may perform the UE Context Setup/Modification procedure with the IAB-donor-DU and/or IAB-nodes which have F1 connection with the IAB-donor-CU(-CP). In case that the IAB-donor-CU is split into the IAB-donor-CU-CP and IAB-donor-CU-UP, the IAB-donor-CU-CP may additionally perform the Bearer Context Setup/Modification procedure with IAB-donor-CU-UP.

If the different/new path is found/selected, the IAB-donor-CU(-CP) may transmit routing information related to sending the DL user data/DL data traffic to the IAB-donor-DU and IAB-node(s) on routing path which the DL user data/DL data traffic is delivered. In case that the IAB-donor-CU is split into the IAB-donor-CU-CP and IAB-donor-CU-UP, the IAB-donor-CU-CP may additionally transmit the routing information related to sending the DL user data/DL data traffic to the IAB-donor-CU-UP on routing path which the DL user data/DL data traffic is delivered.

Then, based on the received information related to transmission status of DL user data/DL data traffic between the IAB-node 1 and the IAB-node 2 (e.g. highest successfully delivered NR PDCP SN, highest transmitted NR PDCP SN or Number of lost NR-U SN ranges reported, etc.), the IAB-donor-CU transfers the DL user data/DL data traffic through new selected path towards the IAB-node 2. In case that the IAB-donor-CU is split into the IAB-donor-CU-CP and IAB-donor-CU-UP, the IAB-donor-CU-CP may send an existing message and/or new message including an indication for instructing the IAB-donor-CU-UP to transmit the DL user data/DL data traffic through new selected path towards the IAB-node 2 and/or the received information related to transmission status of DL user data/DL data traffic between the IAB-node 1 and the IAB-node 2 (e.g. highest successfully delivered NR PDCP SN, highest transmitted NR PDCP SN or Number of lost NR-U SN ranges reported, etc.).

According to the embodiment of the present invention shown in FIG. 13, the IAB-donor-CU(-CP) can know that link congestion and/or blockage occurs between which IAB-nodes through the control plane based feedback to be provided. So, the IAB-donor-CU(-CP) can find an appropriate path for transmitting DL data traffic towards the UE via newly selected IAB-node(s). Furthermore, the IAB-donor-CU(-CP) can stop and/or reduce transmission of DL data traffic towards the IAB-node in which link congestion and/or blockage happens. Therefore, UE's experience can be enhanced and the IAB-donor-CU(-CP) can handle data packets better for a specific UE through the proper multi-hop path and/or the control for transmitting DL data traffic.

The present invention may be applied to various future technologies, such as AI.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 14:
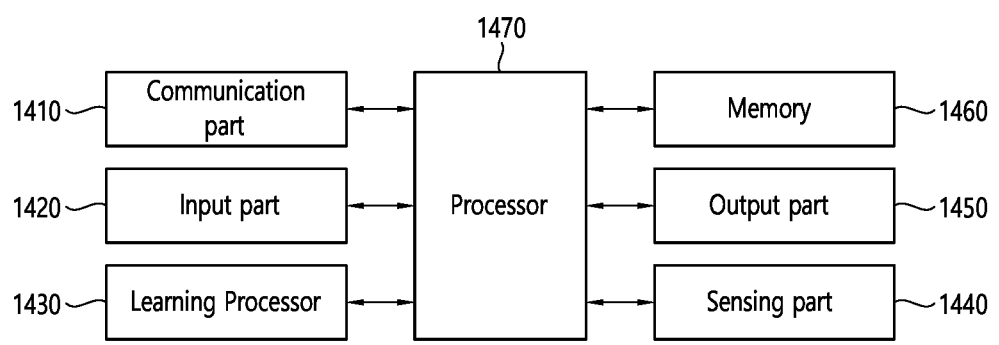
FIG. 14 shows an example of an AI device to which the technical features of the present invention can be applied.

FIG. 14 shows an example of an AI device to which the technical features of the present invention can be applied.

The AI device 1400 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 14, the AI device 1400 may include a communication part 1410, an input part 1420, a learning processor 1430, a sensing part 1440, an output part 1450, a memory 1460, and a processor 1470.

The communication part 1410 can transmit and/or receive data to and/or from external devices such as the AI devices and the AI server using wire and/or wireless communication technology. For example, the communication part 1410 can transmit and/or receive sensor information, a user input, a learning model, and a control signal with external devices. The communication technology used by the communication part 1410 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1420 can acquire various kinds of data. The input part 1420 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1420 can acquire input data to be used when acquiring an output using learning data and a learning model for model learning. The input part 1420 may obtain raw input data, in which case the processor 1470 or the learning processor 1430 may extract input features by preprocessing the input data.

The learning processor 1430 may learn a model composed of an ANN using learning data. The learned ANN can be referred to as a learning model. The learning model can be used to infer result values for new input data rather than learning data, and the inferred values can be used as a basis for determining which actions to perform. The learning processor 1430 may perform AI processing together with the learning processor of the AI server. The learning processor

1430 may include a memory integrated and/or implemented in the AI device 1400. Alternatively, the learning processor 1430 may be implemented using the memory 1460, an external memory directly coupled to the AI device 1400, and/or a memory maintained in an external device.

The sensing part 1440 may acquire at least one of internal information of the AI device 1400, environment information of the AI device 1400, and/or the user information using various sensors. The sensors included in the sensing part 1440 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1450 may generate an output related to visual, auditory, tactile, etc. The output part 1450 may include a display unit for outputting visual information, a speaker for outputting auditory information, and/or a haptic module for outputting tactile information.

The memory 1460 may store data that supports various functions of the AI device 1400. For example, the memory 1460 may store input data acquired by the input part 1420, learning data, a learning model, a learning history, etc.

The processor 1470 may determine at least one executable operation of the AI device 1400 based on information determined and/or generated using a data analysis algorithm and/or a machine learning algorithm. The processor 1470 may then control the components of the AI device 1400 to perform the determined operation. The processor 1470 may request, retrieve, receive, and/or utilize data in the learning processor 1430 and/or the memory 1460, and may control the components of the AI device 1400 to execute the predicted operation and/or the operation determined to be desirable among the at least one executable operation. The processor 1470 may generate a control signal for controlling the external device, and may transmit the generated control signal to the external device, when the external device needs to be linked to perform the determined operation. The processor 1470 may obtain the intention information for the user input and determine the user's requirements based on the obtained intention information. The processor 1470 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1430 and/or learned by the learning processor of the AI server, and/or learned by their distributed processing. The processor 1470 may collect history information including the operation contents of the AI device 1400 and/or the user's feedback on the operation, etc. The processor 1470 may store the collected history information in the memory 1460 and/or the learning processor 1430, and/or transmit to an external device such as the AI server. The collected history information can be used to update the learning model. The processor 1470 may control at least some of the components of AI device 1400 to drive an application program stored in memory 1460. Furthermore, the processor 1470 may operate two or more of the components included in the AI device 1400 in combination with each other for driving the application program.

Figure 15:
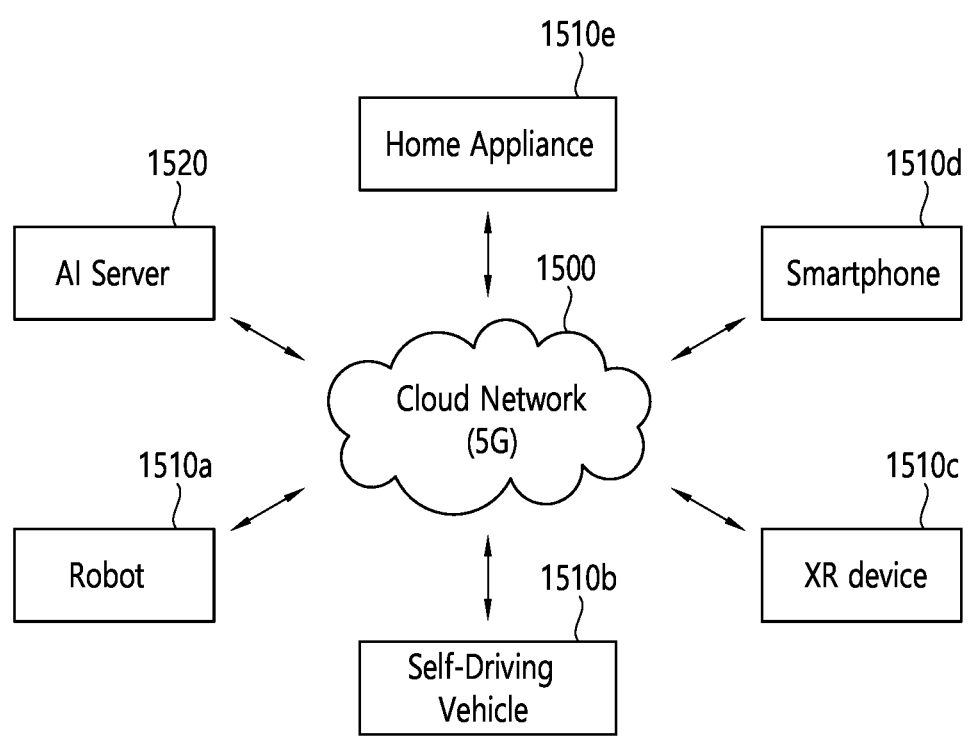
FIG. 15 shows an example of an AI system to which the technical features of the present invention can be applied.

FIG. 15 shows an example of an AI system to which the technical features of the present invention can be applied.

Referring to FIG. 15, in the AI system, at least one of an AI server 1520, a robot 1510a, an autonomous vehicle 1510b, an XR device 1510c, a smartphone 1510d and/or a home appliance 1510e is connected to a cloud network 1500. The robot 1510a, the autonomous vehicle 1510b, the XR device 1510c, the smartphone 1510d, and/or the home appliance 1510e to which the AI technology is applied may be referred to as AI devices 1510a to 1510e.

The cloud network 1500 may refer to a network that forms part of a cloud computing infrastructure and/or resides in a cloud computing infrastructure. The cloud network 1500 may be configured using a 3G network, a 4G or LTE network, and/or a 5G network. That is, each of the devices 1510a to 1510e and 1520 consisting the AI system may be connected to each other through the cloud network 1500. In particular, each of the devices 1510a to 1510e and 1520 may communicate with each other through a base station, but may directly communicate with each other without using a base station.

The AI server 1500 may include a server for performing AI processing and a server for performing operations on big data. The AI server 1500 is connected to at least one or more of AI devices constituting the AI system, i.e. the robot 1510a, the autonomous vehicle 1510b, the XR device 1510c, the smartphone 1510d and/or the home appliance 1510e through the cloud network 1500, and may assist at least some AI processing of the connected AI devices 1510a to 1510e. The AI server 1500 can learn the ANN according to the machine learning algorithm on behalf of the AI devices 1510a to 1510e, and can directly store the learning models and/or transmit them to the AI devices 1510a to 1510e. The AI server 1500 may receive the input data from the AI devices 1510a to 1510e, infer the result value with respect to the received input data using the learning model, generate a response and/or a control command based on the inferred result value, and transmit the generated data to the AI devices 1510a to 1510e. Alternatively, the AI devices 1510a to 1510e may directly infer a result value for the input data using a learning model, and generate a response and/or a control command based on the inferred result value.

Various embodiments of the AI devices 1510a to 1510e to which the technical features of the present invention can be applied will be described. The AI devices 1510a to 1510e shown in FIG. 15 can be seen as specific embodiments of the AI device 1400 shown in FIG. 14.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by an integrated access and backhaul (IAB)-donor-central unit (CU) configured to operate in a wireless communication system, the method comprising:
   configuring an IAB network comprising an IAB-donor, a first IAB-node and a second IAB-node,
   wherein the IAB-donor is a gNB that provides network access to a user equipment (UE) via the IAB network,
   wherein the IAB-donor includes the IAB-donor-CU and an IAB-donor-distributed unit (DU),
   wherein the IAB-donor-CU is a gNB-CU of the IAB-donor, terminating F1 interface towards IAB-nodes, including the first IAB-node and the second IAB-node, and the IAB-donor-DU,
   wherein the IAB-donor-DU is a gNB-DU of the IAB-donor, hosting an IAB backhaul adaptation protocol (BAP) sublayer, providing wireless backhaul to the IAB-nodes,
   wherein each of the first IAB-node and the second IAB-node includes a DU which is a logical node hosting a radio link control (RLC) layer, a media access control (MAC) layer and a physical layer, and
   wherein the first IAB-node is a next-hop IAB-node of the IAB-donor and the second IAB-node is a next-hop IAB-node of the first IAB-node;
   transmitting downlink (DL) user data which is to be transmitted towards the second IAB-node via the IAB-donor-DU and the first IAB-node;
   based on an occurrence of link congestion or a blockage on a backhaul (BH)-radio link control (RLC) channel between the first IAB-node and the second IAB-node, receiving information about a problem on the BH-RLC channel between the first IAB-node and the second IAB-node,
   wherein the information is generated by the first IAB-node and transmitted from the first IAB-node to the IAB-donor-DU via a Downlink Data Delivery Status frame,
   wherein the information received by the IAB-donor-DU via the Downlink Data Delivery Status frame is forwarded by the IAB-donor-DU to the IAB-donor-CU via a Backhaul Status message, and
   wherein the Backhaul Status message includes information related to a transmission status of the DL user data at a time point when the link congestion or the blockage occurs; and
   stopping or reducing transmission of the DL user data towards the second IAB-node via the BH-RLC channel between the first IAB-node and the second IAB-node based on the information.

2. The method of claim 1, further comprising:
   selecting a path towards the second IAB-node other than the BH-RLC channel between the first IAB-node and the second IAB-node, and
   performing a DL transmission towards the second IAB-node via the selected path.

3. The method of claim 1, wherein the information informs the IAB-donor CU that the BH-RLC channel between the first IAB-node and the second IAB-node is congested.

4. The method of claim 1, wherein the information informs the IAB-donor CU that the BH-RLC channel between the first IAB-node and the second IAB-node is blocked.

5. The method of claim 1, wherein the information includes an identity (ID) of at least one of the first IAB-node and/or the second IAB-node.

6. The method of claim 1, wherein the information includes an ID of the IAB-donor-CU.

7. The method of claim 1, wherein the information related to the transmission status of the DL user data includes at least one of a highest successfully delivered packet data convergence protocol (PDCP) sequence number (SN), a highest transmitted PDCP SN and/or a number of lost SN ranges.

8. A method performed by an integrated access and backhaul (IAB)-donor-distributed unit (DU) configured to operate in a wireless communication system, the method comprising:
   configuring an IAB network comprising an IAB-donor, a first IAB-node and a second IAB-node,
   wherein the IAB-donor is a gNB that provides network access to a user equipment (UE) via the IAB network,
   wherein the IAB-donor includes an IAB-donor-central unit (CU) and the IAB-donor-DU,
   wherein the IAB-donor-CU is a gNB-CU of the IAB-donor, terminating F1 interface towards IAB-nodes, including the first IAB-node and the second IAB-node, and the IAB-donor-DU,
   wherein the IAB-donor-DU is a gNB-DU of the IAB-donor, hosting an IAB backhaul adaptation protocol (BAP) sublayer, providing wireless backhaul to the IAB-nodes,
   wherein each of the first IAB-node and the second IAB-node includes a DU which is a logical node hosting a radio link control (RLC) layer, a media access control (MAC) layer and a physical layer, and
   wherein the first IAB-node is a next-hop IAB-node of the IAB-donor and the second IAB-node is a next-hop IAB-node of the first IAB-node;
   receiving, from the IAB-donor-CU, downlink (DL) user data which is to be transmitted towards the second IAB-node via the IAB-donor-DU and the first IAB-node;
   forwarding the DL user data to the first IAB-node;
   based on an occurrence of link congestion or a blockage on a backhaul (BH)-radio link control (RLC) channel between the first IAB-node and the second IAB-node, receiving, from the first IAB-node via a Downlink Data Delivery Status frame, information about a problem on the BH-RLC channel between the first IAB-node and the second IAB-node; and
   forwarding, to the IAB-donor-CU via a Backhaul Status message, the information,
   wherein the Backhaul Status message includes information related to a transmission status of the DL user data at a time point when the link congestion or the blockage occurs, and
   wherein transmission of the DL user data towards the second IAB-node via the BH-RLC channel between the first IAB-node and the second IAB-node is stopped or reduced based on the information.

* * * * *